United States Patent
Robertson

(10) Patent No.: US 6,318,761 B1
(45) Date of Patent: Nov. 20, 2001

(54) REPLACEMENT FITTING FOR RIGID, PLASTIC PIPES

(75) Inventor: Duane D. Robertson, 122 Loveland Way, Golden, CO (US) 80401

(73) Assignee: Duane D. Robertson, Golden, CO (US)

(*) Notice: Subject to any disclaimer, the term of this patent is extended or adjusted under 35 U.S.C. 154(b) by 0 days.

(21) Appl. No.: 09/449,847

(22) Filed: Nov. 26, 1999

(51) Int. Cl.[7] .................................................. F16L 13/10
(52) U.S. Cl. ............................ 285/31; 285/423; 285/915
(58) Field of Search ............................ 285/31, 32, 423, 285/915

(56) References Cited

U.S. PATENT DOCUMENTS

| | | |
|---|---|---|
| H176 | 12/1986 | Johnstone, Jr. . |
| 591,362 | 10/1897 | Sisson . |
| 666,316 | 1/1901 | Kenneally . |
| 1,933,915 | 11/1933 | Lindquist et al. . |
| 2,037,812 | 4/1936 | McKendrick . |
| 2,202,312 | 5/1940 | Frances . |
| 2,297,966 * | 10/1942 | Luff .......................................... 285/32 |
| 2,449,803 | 9/1948 | Collison . |
| 2,461,828 | 2/1949 | Lomelino . |
| 2,551,393 | 5/1951 | Pinger . |
| 2,595,705 | 5/1952 | Rosecrans, Sr. . |
| 2,641,491 | 6/1953 | Mueller et al. . |
| 2,871,032 * | 1/1959 | Woodling ............................... 285/31 |
| 3,857,588 | 12/1974 | Curtin . |
| 3,865,410 | 2/1975 | Chen . |
| 3,971,574 | 7/1976 | Curtin . |
| 4,013,309 | 3/1977 | Quick . |
| 4,035,002 | 7/1977 | Curtin . |
| 4,386,796 * | 6/1983 | Lyall et al. ............................. 285/31 |
| 4,521,037 | 6/1985 | Knox . |
| 4,687,232 * | 8/1987 | Zimmerman ........................... 285/31 |
| 4,690,434 | 9/1987 | Schmidt . |
| 4,836,581 * | 6/1989 | Guilloteau ............................. 285/31 |
| 4,858,958 | 8/1989 | Harbeke . |
| 5,039,134 | 8/1991 | Meadows et al. . |
| 5,090,743 | 2/1992 | Obering . |
| 5,487,571 | 1/1996 | Robertson . |
| 5,975,587 * | 11/1999 | Wood et al. ............................ 285/31 |

FOREIGN PATENT DOCUMENTS

| | | | |
|---|---|---|---|
| 2135415 * | 8/1984 | (GB) | ....................................... 285/31 |
| 173261 * | 12/1921 | (GB) | ....................................... 285/32 |
| 378780 * | 8/1932 | (GB) | ....................................... 285/32 |

* cited by examiner

Primary Examiner—Eric K. Nicholson
(74) Attorney, Agent, or Firm—W. Scott Carson

(57) ABSTRACT

Replacement fittings for substantially rigid pipes. Each fitting preferably includes a main body with telescoping, sleeve members mounted on it. The sleeve members can be individually slid along the main body but cannot be removed from it. In this manner, the preferred fittings of the present invention can be handled as a single unit and all of the linked pieces will stay together and cannot be inadvertently left behind. They also cannot be accidentally lost or dropped on the way to the job site or during the repair operation. The various pieces of the fittings employ tapering surfaces that not only ensure the pieces will stay together while the fittings are being manipulated into position but also aid in creating the strongest bonds and seals with the pipes.

29 Claims, 5 Drawing Sheets

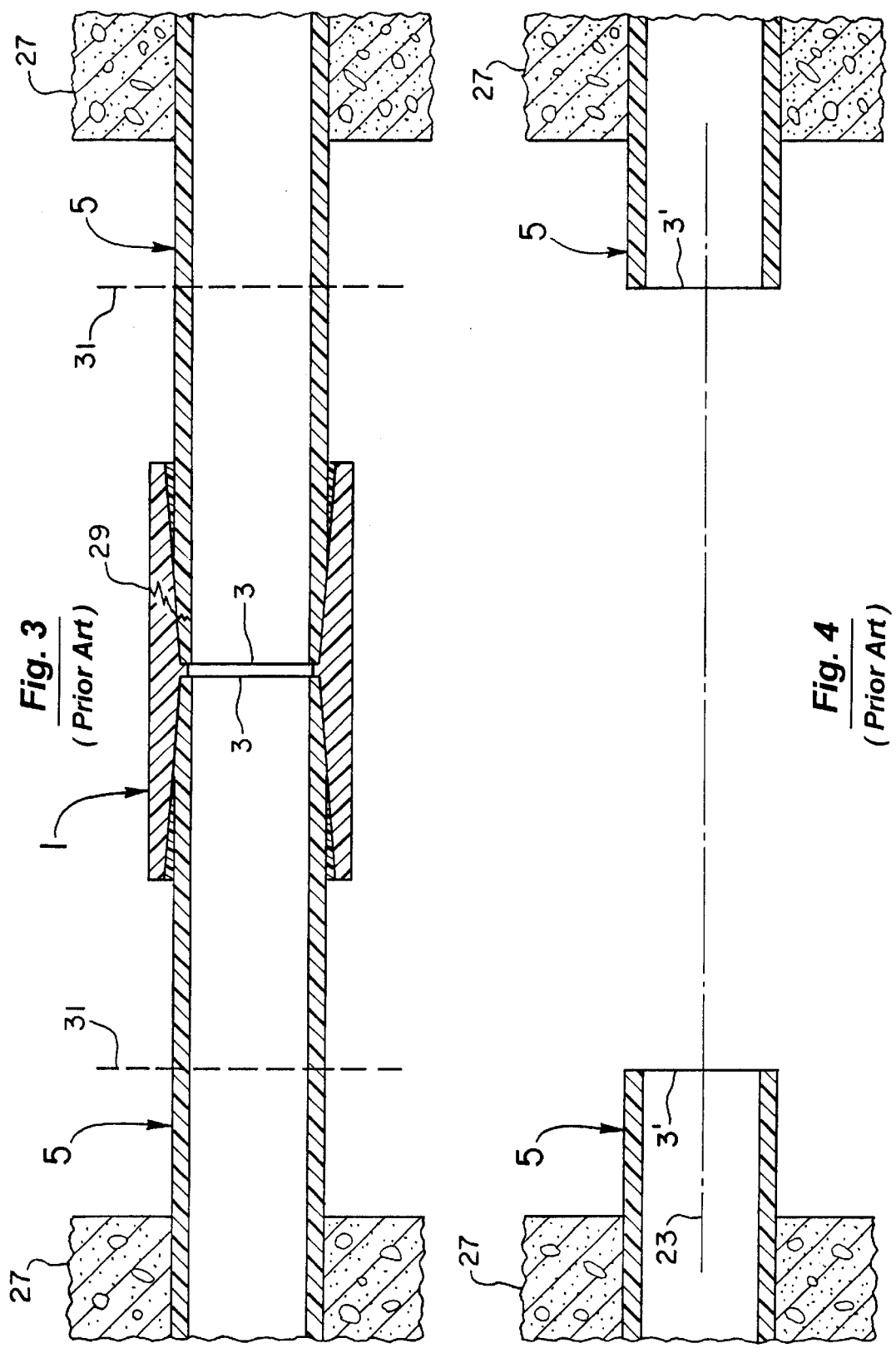

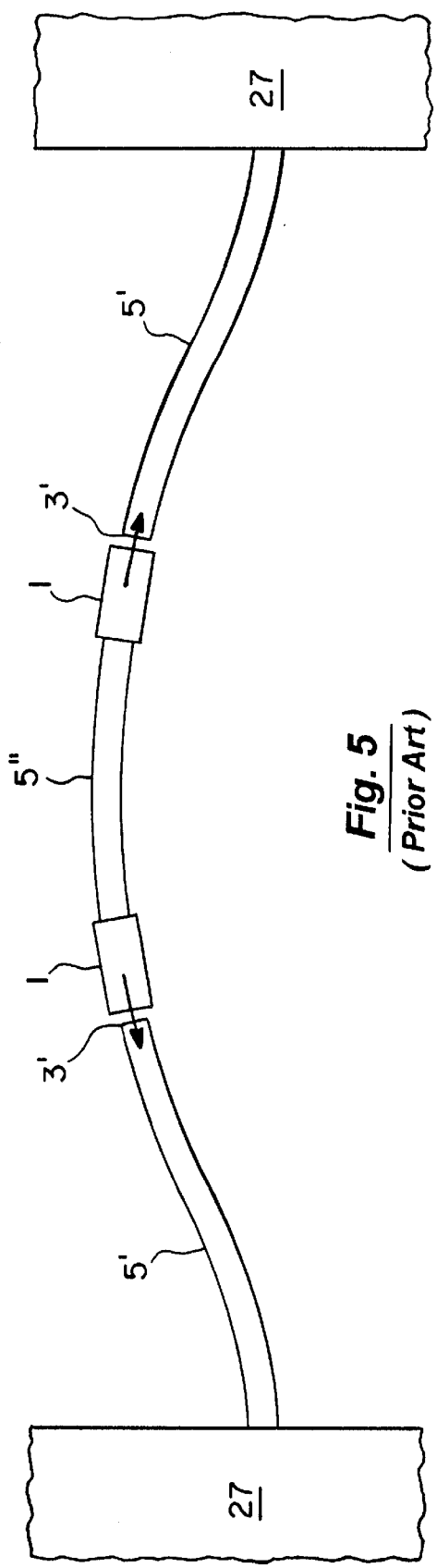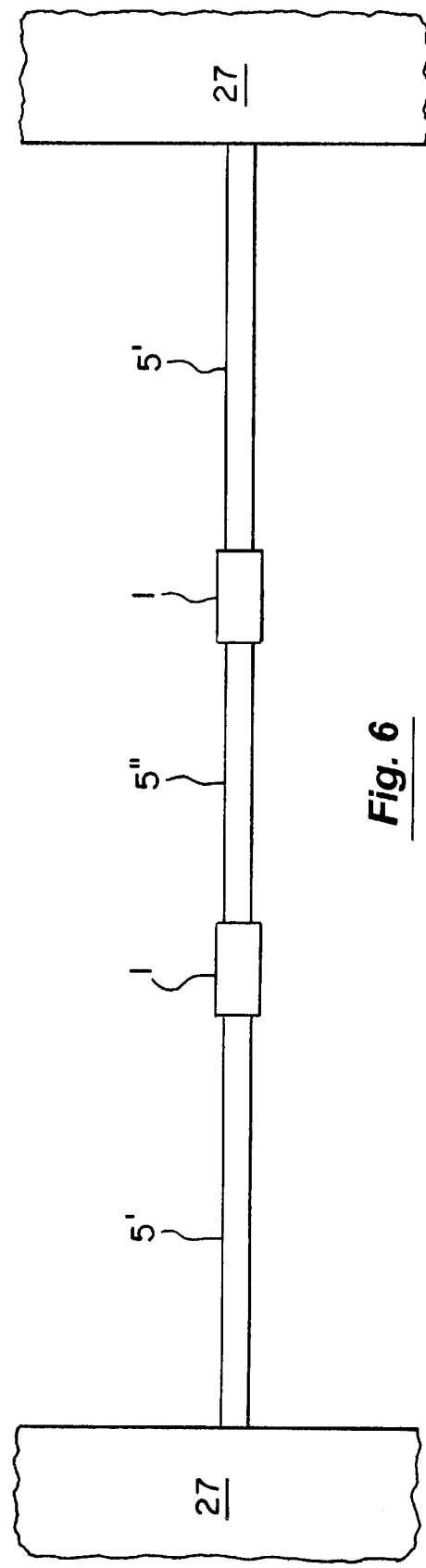

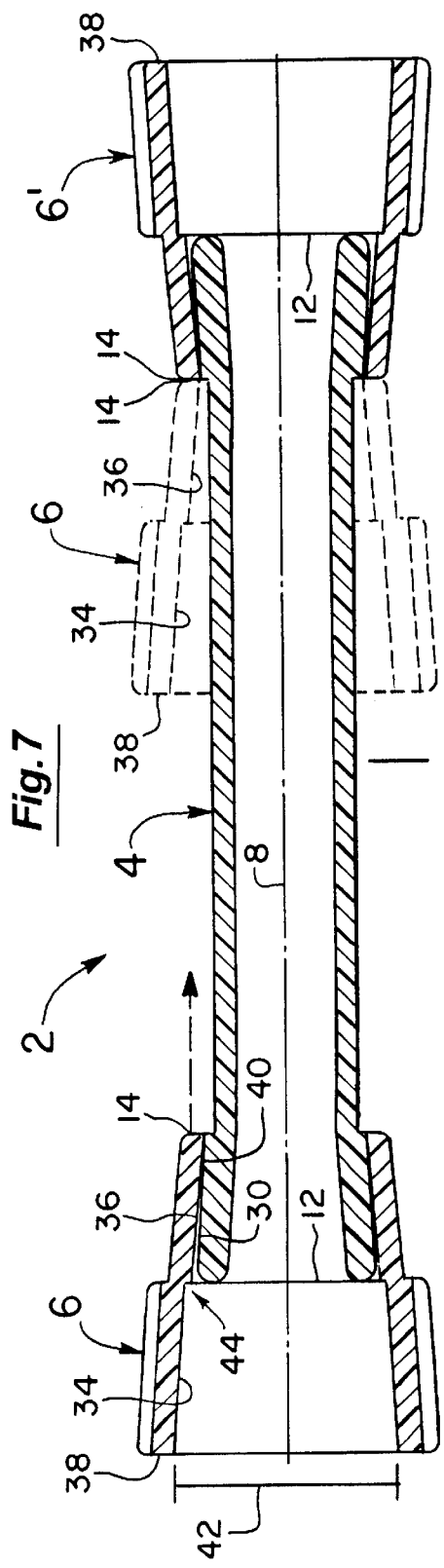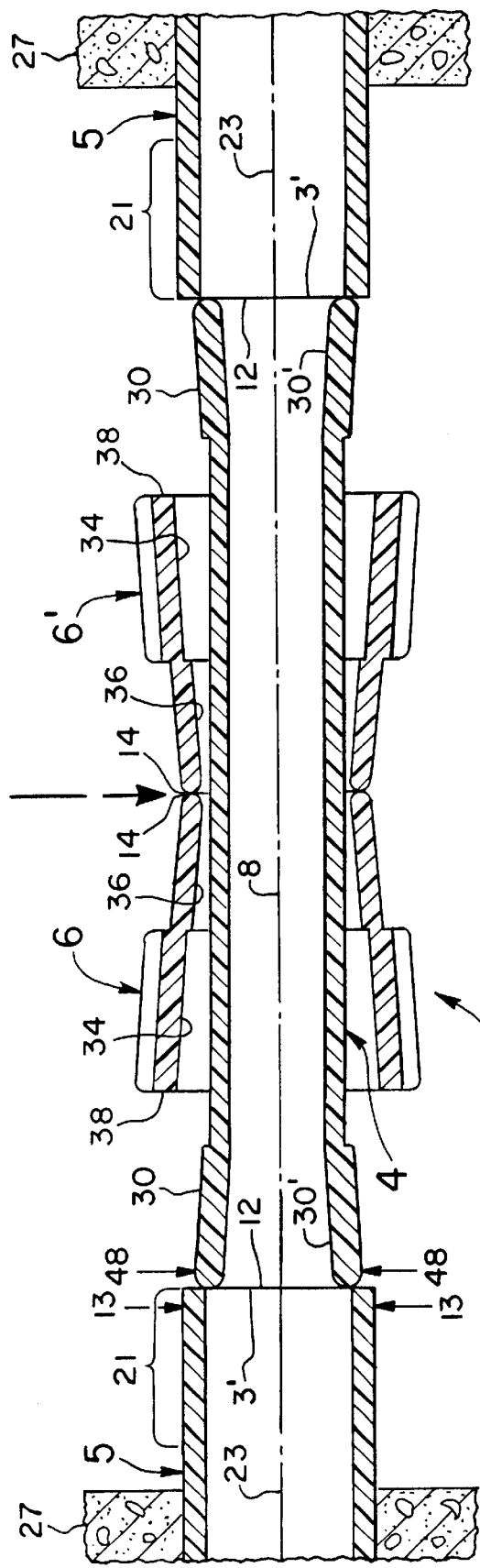

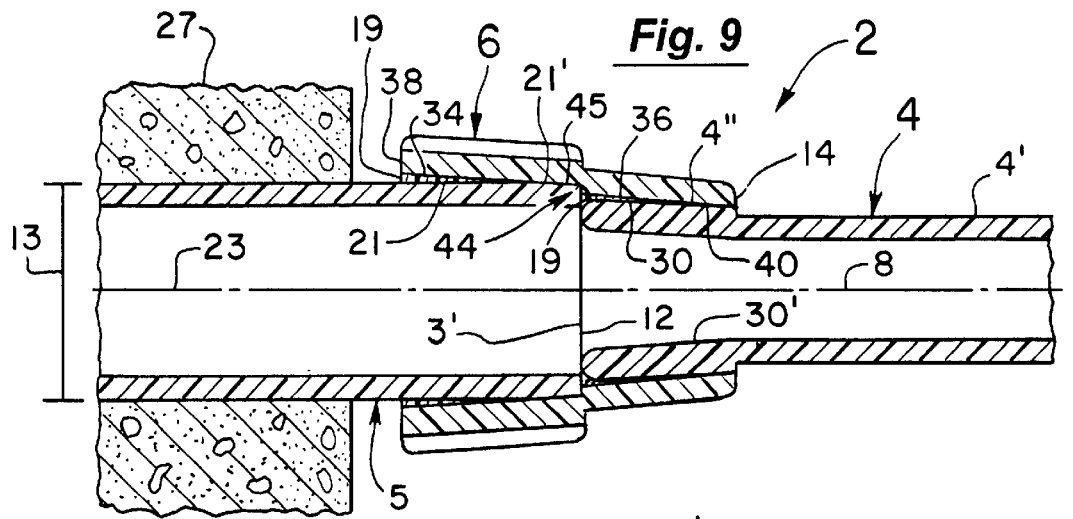
Fig. 9
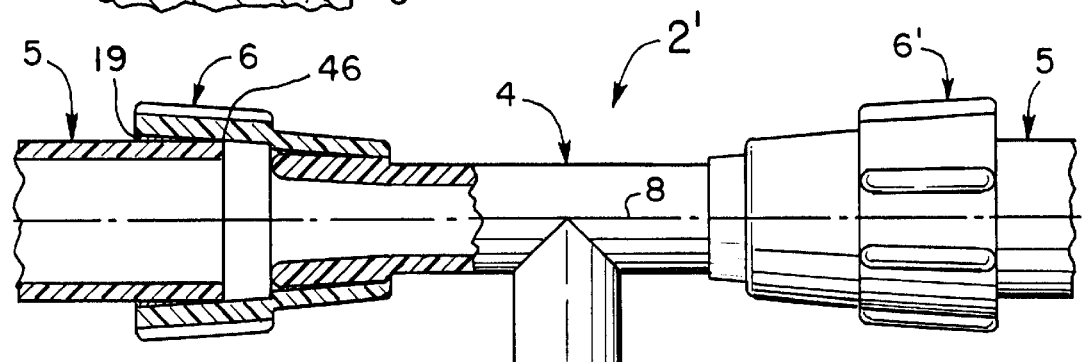
Fig. 10
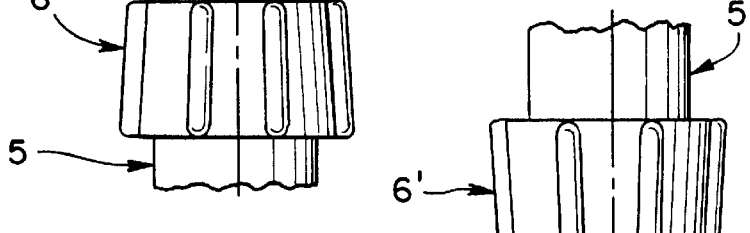
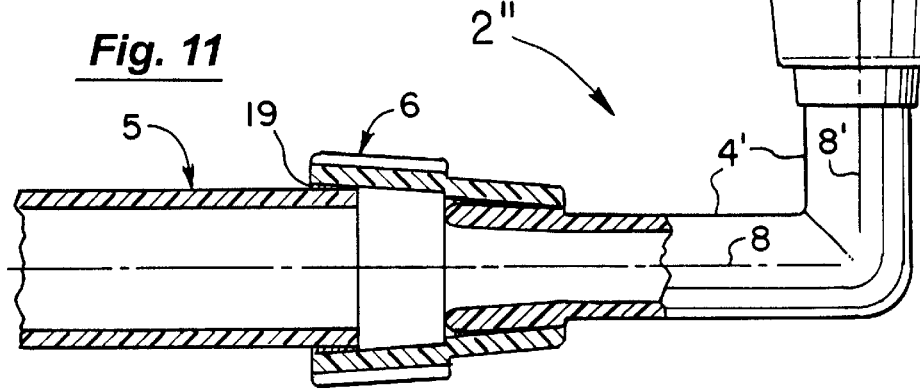
Fig. 11

REPLACEMENT FITTING FOR RIGID, PLASTIC PIPES

BACKGROUND OF THE INVENTION

1. Field of the Invention

This invention relates primarily to the field of replacement fittings or couplings for substantially rigid, plastic pipes such as polyvinylchloride (PVC) pipes whose ends are fixed relative to each other or otherwise cannot be easily moved relative to each other.

2. Discussion of the Background

Replacing couplings or fittings between pipe ends that are fixed relative to each other or otherwise cannot be easily moved relative to each other presents special problems. Such pipes may have been initially coupled to each other in any number of easy and conventional manners (e.g., by a simple, open-ended socket coupler) when one or both of the pipes could be moved toward each other. However, once the coupled pipes are fixed in place (e.g., in the ground, in concrete, or to joists), replacing the coupling should it become broken or begin to leak becomes much more difficult. This is true because the pipes and their ends can no longer be moved (or at least not easily moved) relative to each other, particularly if the pipes are made of rigid material such as PVC. Consequently, in nearly all such cases, a replacement coupling must be used that will initially fit between the fixed ends of the pipes and then be outwardly adjustable or expandable to extend over the spaced-apart ends of the pipes.

Several replacement couplings or fittings exist which have telescoping members. In use, these couplings can be initially placed between the fixed ends of the pipes and then expanded or telescoped outwardly over the pipe ends. However, these couplings have a number of pieces or parts adding to both the cost and difficulty of using them. Further, these various pieces or parts are not initially linked or joined together and must be separately handled. Consequently, in use, it is first necessary for the installer to be sure he brings all of the necessary pieces and in the right sizes to the job site. Second, he must be careful at the job site not to drop or otherwise lose any of the separable pieces of the coupling. Such disadvantages can be critical. For example, the installer may find he does not have all of the necessary pieces (or in the right sizes) when he arrives at the job site. Additionally, in the usually tight quarters of the repair area, he may easily drop or lose one of the coupling pieces.

With this in mind, the replacement fitting of the present invention was developed. With it, all of the necessary pieces of the fitting are initially linked together into a single unit and cannot be inadvertently separated from one another. In use, the installer need only carry the single unit of linked pieces in one hand knowing all of the individual pieces of the fitting are there and are in the right sizes for each other. He also does not have to worry about dropping or otherwise losing any of the pieces on the way to the job site or at the site itself. Further, the repair can be accomplished with the fitting of the present invention by merely sliding individual sleeve members outwardly on a main body over the pipe ends.

SUMMARY OF THE INVENTION

The present invention involves replacement fittings for substantially rigid pipes. Each fitting preferably includes a main body with telescoping, sleeve members mounted on it. The sleeve members can be individually slid along the main body but cannot be removed from it. In this manner, the preferred fittings of the present invention can be handled as a single unit and all of the linked pieces will stay together and cannot be inadvertently left behind. They also cannot be accidentally lost or dropped on the way to the job site or during the repair operation. The various pieces of the fittings employ tapering surfaces that not only ensure the pieces will stay together while the fittings are being manipulated into position but also aid in creating the strongest bonds and seals with the pipes.

BRIEF DESCRIPTION OF THE DRAWINGS

FIG. 3 illustrates the joined pipes of FIG. 2 as subsequently fixed in concrete. FIG. 3 also shows where the joined pipes would be conventionally cut should a break or leak develop and the coupling need to be replaced.

FIG. 4 shows the relative spacing of the pipes once the failed coupling of FIG. 3 is cut out. The newly cut ends of the rigid pipes as illustrated are fairly close to each other and are fixed in place relative to each other.

FIGS. 5 and 6 illustrate a common way of replacing a failed coupling if the pipes are fairly flexible and/or their ends can be moved relative to each other to accommodate a non-expanding coupler arrangement.

FIG. 7 illustrates a preferred embodiment of the present invention. In it, the slidable sleeve members are shown in solid lines in their outwardly extended positions on each end of the main body of the fitting. FIG. 7 also shows in dotted lines the left sleeve member moved as far as it can be moved to the right to abut the other sleeve member.

FIG. 8 shows the preferred embodiment of FIG. 7 with the sleeve members retracted and the fitting of the present invention positioned between the ends of the fixed, rigid pipes.

FIG. 9 illustrates the basic sealing structure of the present invention with the various pieces of the fitting in their preferred sealing positions.

FIG. 10 shows the basic sealing structure of the present invention adapted for use in a Tee-shaped fitting.

FIG. 11 illustrates the basic sealing structure of the present invention adapted for use in an elbow fitting

DETAILED DESCRIPTION OF THE PREFERRED EMBODIMENTS

Figure 1:
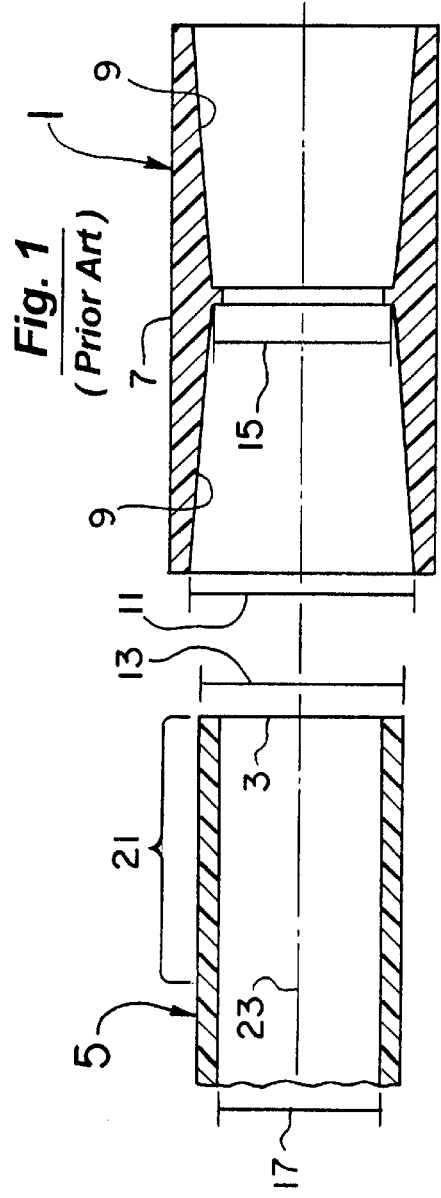
FIG. 1 illustrates one of the most commonly used coupler arrangements for joining plastic pipes and in particular, plastic pipes made of rigid material such as PVC.

FIG. 1 illustrates one of the most commonly used couplers 1 for joining the open ends 3 of cylindrical pipes such as 5. As shown, the socket coupler 1 has a cylindrical outer surface 7 and two inwardly tapering surfaces 9 on each side. Consistent with ASTM (American Society For Testing And Materials) industry standards, each surface 9 tapers down from a diameter at 11 slightly greater than the outer diameter 13 of the pipe 5 to a diameter at 15 slightly less than the outer diameter 13 of the pipe 5. For example, with an industry standard, schedule 40, three-fourths inch pipe 5 with an inner diameter 17 of 0.815 inches and an outer diameter 13 of 1.050 inches, each inner surface 9 of the socket coupler 1 would taper down from 1.058 inches at 11 to 1.046 inches at 15. The industry standard taper is thus from a diameter at 11 of 0.008 inches larger than the outer diameter of the pipe 5 down to a diameter at 15 of 0.004 inches smaller than the outer diameter 13 of the pipe 5. For larger pipes 5 (e.g., one inch pipe), the industry taper is greater (e.g., from a diameter at 11 of 0.010 inches larger than the outer diameter 13 of the pipe 5 down to 0.005 inches smaller at 15). Regardless of the size of pipe 5, the industry taper is always desirable consistent with ASTM standards. It is noted at this time that all of the tapers in FIG. 1 and throughout the other drawings are greatly exaggerated in order to better illustrate the invention.

When the common socket 1 of FIG. 1 is used to join pipes such as 5 which can be freely moved relative to each other, the coupling process is fairly simple. That is, sealing solvent 19 is first applied about the outer surface portions 21 of the pipes 5 adjacent the open ends 3 and on the tapering, inner surfaces 9 of the coupler 1. The pipes 5 can then be easily moved to the joined position of FIG. 2. Typically, the coupler 1 and/or pipes 5 are twisted about the axis 23 as this is done to ensure an even and complete smearing of the sealing solvent 19 on the various surfaces 21 and 9. Additionally, where the sections 21' of the surface portions 21 immediately adjacent the pipe ends 3 abut and are pinched down against surfaces 9 of the coupler 1 in FIG. 2, the sealing material 19 is preferably one that chemically reacts and fuses the sections 21' of the pipe surfaces 21 to the coupler surfaces 9.

Figure 2:
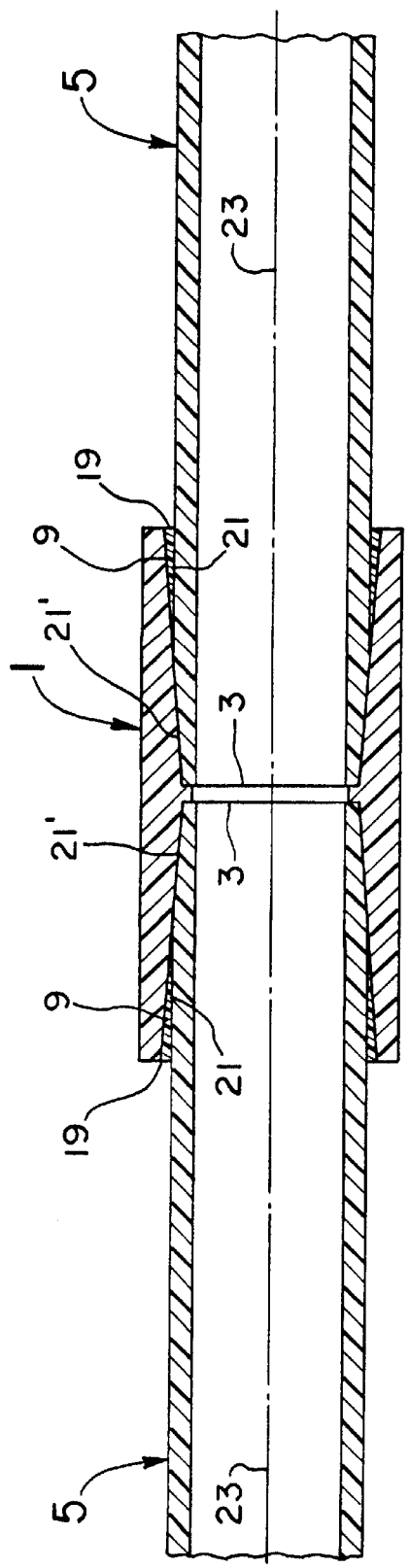
FIG. 2 shows how the prior art coupler and pipes of FIG. 1 are traditionally positioned when they are joined.

In many common applications, the coupled pipes 5 of FIG. 2 are then fixed in place to joists, buried in the ground, or fixed in concrete 27 as illustrated in FIG. 3. Should the coupler 1 and/or pipe 5 begin to leak or become fractured (e.g., see crack 29 in FIG. 3) and need to be replaced, the coupler 1 and coupled pipes ends 3 are normally cut away at 31 creating new pipe ends 3' (see FIG. 4). These new pipe ends 3' as shown are spaced farther apart than the original ends 3 of FIG. 3.

If the pipes 5 of FIG. 4 were not fixed in place, it would be a simple matter to re-connect the new pipe ends 3' in the manner of FIGS. 1 and 2, again using a common socket coupler 1. Additionally, if the exposed segments of the pipes sticking out of the concrete 27 were longer (see segments 5' in FIG. 5) and/or the pipe material were very flexible, it might also be possible to make the re-connection in the known manner of FIGS. 5 and 6. In this manner, the exposed pipe segments 5' are flexed or arched to align the pipe ends 3' with the respective couplers 1 on the extension pipe 5". Subsequent movement of the members 1, 3', 5', and 5" downwardly to the position of FIG. 6 then serves to drive the pipe ends 3' axially into the respective couplers 1 in the general manner of FIGS. 1 and 2. Other techniques also exist to re-connect pipes like 5' in FIGS. 5 and 6 where the pipes 5' and pipe ends 3' can be flexed or otherwise moved relative to each other. However, where this is not possible as in FIG. 4 because the exposed pipe segments are too short or the material of the pipes 5 is too rigid and inflexible, it becomes necessary to use an expanding or telescoping coupler such as the fitting 2 of the present invention.

As best seen in FIG. 7, the preferred embodiment of the fitting 2 of the present invention includes a main body 4 with two sleeve members 6 and 6' mounted thereabout. The main body 4 as shown extends along and about the axis 8. The individual sleeve members 6 and 6' in FIG. 7 are shown in solid lines in extreme positions extending outwardly beyond the respective open ends 12 of the main body 4. In this regard, each sleeve member 6 and 6' is mounted about the main body 4 for sliding movement relative to the main body 4 between at least first and second positions. However, the sleeve members 6 and 6' cannot be removed from about the main body 4.

More specifically, the sleeve member 6 in FIG. 7 can be slid on the main body 4 between the extreme positions of completely extended to the left (as shown in solid lines in FIG. 7) to the position shown on the right side in dotted lines in FIG. 7 abutting the extended sleeve member 6'. Sleeve member 6' in turn can only be slid between similar extreme positions but cannot be removed from the main body 4. In this manner, all of the pieces 4, 6, and 6' of the fitting 2 are linked or joined together in one unit and cannot be separated. Consequently, the fitting 2 can be carried as a unit to the job site without fear of forgetting a piece or dropping a piece. Perhaps more importantly, the fitting 2 can be manipulated into place in the usually tight quarters of the job site also without fear of dropping or losing any of the pieces of the fitting 2 necessary to make the repair.

In this regard, each sleeve member 6 and 6' is molded of plastic (e.g., PVC). While each sleeve member 6 and 6' is still hot from the molding process (e.g., 200 degrees F.), the smaller ends 14 in FIG. 7 of the sleeve members 6 and 6' are respectively popped over the larger ends 12 of the main body 4. This can be done, for example, manually with a rubber mallet. The hot, plastic sleeve members 6 and 6' at this point have only begun to contract and will even stretch somewhat to go over the larger ends 12 of the main body 4. Once cooled, each sleeve member 6 and 6' can be slid as discussed above along the main body 4 but cannot be removed from the main body 4. Each sleeve member 6 and 6' can actually be slid to a number of intermediate positions but is prevented from going beyond the extreme left and right positions as illustrated in FIG. 7 in solid and dotted lines in reference to sleeve member 6. The sleeve members 6 and 6' are therefore maintained at all times on the main body 4 and these linked pieces 4, 6, and 6' of the fitting 2 cannot be separated from each other.

In use to couple the ends 3' of the fixed-in-place pipes 5 of FIGS. 4 and 8, the extended sleeve members 6 and 6' of FIG. 7 are first slid inwardly on the main body 4 to the retracted positions of FIG. 8. In these retracted positions, the abutting sleeve members 6 and 6' are preferably dimensioned not to extend beyond the ends 12 of the main body 4. In this way, the distance between the ends 12 of the main body 4 defines the minimum dimension not only of the main body 4 but also of the entire fitting 2. This minimum dimension is then no greater than and can be less than the distance or spacing between the pipe ends 3' in FIG. 8. If this distance is essentially the same as the pipe spacing, then the ends 12 of the fitting 2 will somewhat rub against the pipe ends 2' as the fitting 2 is manually maneuvered into place. The fitting 2 with the sleeve members 6 and 6' retracted as in FIG. 8 can thus be positioned as in FIG. 8 with the respective pipe ends 3' and main body ends 12 adjacent and even slightly abutting one another. In this position, the pipe axes 23 and main body axis 8 are also aligned substantially in a co-linear manner. Thereafter, sealing solvent 19 is preferably applied to the outer, cylindrical surfaces 21 of the pipes 5 adjacent the ends 3' as well as to the outwardly tapering surfaces 30 adjacent each end 12 of the main body 4. The sleeve members 6 and 6' in this regard are preferably dimensioned as in FIG. 8 so the sleeve members 6 and 6' in the retracted positions of FIG. 8 leave the surfaces 30 exposed so the sealing solvent 19 can be easily applied to the surfaces 30.

The respective sleeve members 6 and 6' are thereafter moved to the extended positions of FIGS. 7 and 9 to form the seals (see in particular FIG. 9). This movement of the sleeve members 6 and 6' can be done simultaneously or sequentially (e.g., first sleeve member 6 and then sleeve member 6'). Regardless, the sleeve members 6 and 6' are preferably rotated or twisted during this movement to help smear the sealing solvent 19 over the surfaces 21 and 30 and on the covering surfaces 34 and 36 on each sleeve member 6 and 6' (see FIG. 9). The sealing solvent 19 as shown is directly between the pair of surfaces 21 and 34 and pair of surfaces 30 and 36.

Each outer surface 30 preferably tapers inwardly away from the respective main body end 12 (see FIG. 8). Conversely, the inner surface 36 on each sleeve member 6 and 6' preferably tapers outwardly from adjacent the respective sleeve member end 14 toward the other sleeve member end 38. In this manner as illustrated in reference to sleeve member 6 in FIG. 9, the surfaces 30 and 36 at least substantially abut and mate with the sealing solvent 19 positioned directly therebetween. Preferably, the surfaces 30 and 36 at area 40 actually do abut and are pinched wherein the sealing solvent 19 will chemically react and fuse the surfaces 30 and 36 of PVC together at area 40 for the strongest bond and seal. Prior to the application of the sealing solvent 19, this abutting area 40 is also part of the structure that keeps the sleeve members 6 and 6' from moving outwardly beyond the extended positions of FIG. 7. This in turn prevents the sleeve members 6 and 6' from being removed from the main body 4 while the fitting 2 is being carried to the job site or manipulated between the pipe ends 3' to be joined.

Referring again to FIG. 8, the inner surface 34 adjacent surface 36 on each sleeve member 6 and 6' also preferably tapers inwardly from the respective sleeve member end 38. The taper adjacent the sleeve member end 38 preferably begins at an inner diameter at 42 (see FIG. 7) that is greater than the outer diameter 13 of the pipe 5 of FIG. 8. Additionally, each surface 34 preferably tapers continuously downwardly to an inner diameter at step 44 in FIG. 7 that is less than the outer diameter 13 of the pipe 5. Because the surface 34 in FIG. 9 tapers to an inner diameter at 44 less than the outer diameter 13 of the pipe 5, the outer pipe surface 21 and sleeve surface 34 will preferably actually abut and pinch at area 45 in FIG. 9. As with surfaces 30 and 36 at 40, the sealing solvent 19 directly between the surfaces 21 and 34 will then chemically react and fuse the surfaces 21 and 34 together at area 45. The various surfaces do not have to abut and/or pinch to create an effective seal but preferably do so the sealing solvent can actually fuse the touching or crimped surface sections together for the strongest bond and seal.

For reference and with an industry standard, three-fourths inch pipe 5 with an outer diameter 13 of 1.050 inches, the taper of surface 34 is preferably continuous from 1.058 inches at end 38 in FIG. 7 down to 1.046 inches at step 44. As previously noted, the tapers in the drawings are greatly exaggerated to better illustrate the invention.

The adjacent surfaces 34 and 36 of each sleeve member 6 and 6' in FIGS. 7–9 are preferably offset from each other at the step 44. In this manner, the surface 34 will not tend to scrape the applied sealing solvent 19 off the surface 30 of the main body 4 as the surface 34 passes by. That is, during the coupling operation, the sealing solvent 19 is initially applied to the surface 30 on each end 12 of the main body 4 in FIG. 8. Thereafter, each sleeve member 6 and 6' is slid outwardly to the extended position of FIGS. 7 and 9. If the surfaces 34 and 36 were completely continuous without the step or offset 44, the surface 34 might have a tendency to scrape some of the sealing solvent 19 off the surface 30 as the surface 34 passed by. With the various tapers, the surfaces 30, 34, and 36 are essentially frusto-conical shapes. It is again noted that all of the tapers of the drawings are greatly exaggerated. As for example as discussed above, the taper of surface 34 is essentially only from a diameter of 1.058 inches at 38 (for a three-fourths inch pipe 5) down to 1.046 inches at 44 over a distance of only about an inch. Surface 34 then steps down at 44 about 0.019 inches to a diameter on surface 26 of 1.008 inches. Surface 36 subsequently tapers down over a distance of less than an inch to a diameter of 0.978 inches adjacent sleeve member end 14. The surface 34 is thus actually very close to the surface 30 as surface 34 passes by. Consequently, the increased spacing (even if only thousandths of an inch) created by the step or offset 44 offers a significant advantage to reducing the possibility that sealing solvent 19 will be scraped off surface 30 by surface 34.

Further, this offset at 44 allows the outer maximum diameter 48 of each end 12 of the main body 4 (see FIG. 8) to be less than the outer diameter 13 of the pipe 5. Stated another way, the smaller outer diameter 48 of the ends 12 (e.g., one inch versus the 1.050 inches of pipe diameter 13 for a three-fourths inch pipe 5) permits the tapered surfaces 34 to preferably abut and pinch or crimp the pipe at area 46 in FIG. 9 so the sealing solvent 19 can react and fuse the surfaces 21 and 34 together at area 46. The incline or taper of the surfaces 34 and 36 could be continuous but the offset at 44 allows for a more abrupt transition so that the tapered surface at 36 will receive and preferably abut the pipe end 3' in a shorter distance. The pipe ends 3' and main body ends 12 can then be positioned as closely as possible and preferably actually abut. This close spacing in turn helps keep a laminar flow through the pipes 5 and fitting 2. The ends 12 of the main body 4 in this regard are preferably even radiused to further help maintain a laminar flow with as little turbulence (friction) as possible. The offset 44 also allows the inclines of the surfaces 24 and 36 to be different degrees or slopes relative to the axis 8. The slopes could be uniform if desired but in the preferred embodiment of FIG. 9, the slope of surface 36 is, for example, actually greater to better follow the sloping surface 30.

The embodiment of FIGS. 7–9 is illustrated as having sleeve members 6 and 6' on each end 12 of the main body 4. However, the basic sealing structure on each end 12 of the main body 4 could be used alone as essentially illustrated in FIG. 9. If used alone or with, for example, a coupler like 1 of FIG. 1 on the other end of main body 4, the basic sealing structure of the present invention would still have at least a main body like 4 and at least one sleeve member such as 6 in FIG. 9. The main body 4 would still have a first, preferably cylindrical portion 4' (see FIG. 9) and an integral, second portion 4" with the sleeve member 6 positioned about at least a part of the main body 4. Additionally, the outer surface at 30 would still taper outwardly from portion 4' toward the end 12 as would the inner surface 301. The tapering surface 36 of the sleeve member 6 in turn would also at least substantially abut and mate with the surface 30 with the sealing solvent 19 positioned directly between the surfaces 30 and 36. Preferably, the surfaces 30 and 36 would actually abut and pinch at area 40 as discussed above to be fused together at area 40 by the reaction of the sealing solvent 19.

As illustrated in FIGS. 10 and 11, the basic sealing structure of the present invention can be easily adapted for use in Tee-shaped fittings such as 2' of FIG. 10 and elbow fittings like 2" of FIG. 11. Tee-fitting 2' is essentially fitting 2 of FIGS. 7–9 with a third leg extending along an axis 8' perpendicular to axis 8. In the elbow fitting 2" of FIG. 11, the parts 4' of the main body extend along intersecting axes 8 and 8' that are substantially perpendicular to each other. With all of the fittings 2, 2', and 2", it is preferred but not necessary to have the basic, expandable, sealing structure of the preferred embodiment on each end of the parts of the main body 4. Nevertheless, for the fittings to still be expandable to join fixed-in-place pipes, it is only necessary that at least one end (in the cases of in-line fitting 2 and elbow fitting 2") and at least two ends in the case of the Tee-shaped fitting 2' have the expandable structure of the present invention. Also, because of the expanding or telescoping nature of the fittings of the present invention, effective seals can still be achieved even though the pipes 5 and fittings are not exactly cut and dimensioned to create the abutting and pinched or crimped areas 21' and 40 of FIG. 9. For example as illustrated in FIG. 10, the sleeve member 6 ended up only abutting the pipe 5 at the circular contact 46. Consequently, the sealing solvent 19 would then only fuse the pipe 6 and sleeve member 6 together about the contact 46. In FIG. 11, the sleeve member 6 ended up not actually abutting the pipe 5 so in that case, the seal between therebetween is achieved by the sealing solvent 19 alone. In this regard and although the preferred seal is achieved in the proper cutting and dimensioning of the pipe 5 and fitting as in FIG. 9, effective seals can still be obtained with the structure of the present invention in the less precise relationships illustrated in FIGS. 10 and While several embodiments of the present invention have been shown and described in detail, it is to be understood that various changes and modifications could be made without departing from the scope of the invention.

I claim:

1. A pipe fitting (2) for a substantially cylindrical pipe (5), the pipe extending along and about a first axis (23) and having inner and outer cylindrical, substantially smooth, non-tapered, non-threaded surfaces with respective inner and outer, constant diameters, the pipe further having at least one open end (3'), said pipe fitting (2) having a main body (4) extending at least in part along a second axis (8) and a sleeve member (6) extending about said part of said main body and mounted for sliding movement relative to said main body between at least first and second positions spaced from each other along said second axis (8), said main body having means for preventing said sleeve member from being slid along said second axis beyond said first and second positions to thereby maintain said slidable sleeve member on said main body and wherein said part of said main body extends for a first distance along said second axis between two locations and said sleeve member extends between two ends (14, 38) along said second axis for a second distance less than said first distance, said sleeve member being positionable about said part with the ends (14, 38) of said sleeve member between said two locations, said main body (4) being positionable adjacent the open end (3') of said pipe (5) with said first (23) and second (8) axes substantially co-linear, said sleeve member (6) having two open ends (14, 38) spaced from each other along the second axis, said sleeve member further including a substantially smooth, non-threaded inner surface (34) tapering inwardly substantially from one (38) of the open ends of said sleeve member toward the other open end (14) thereof, said inner surface of said sleeve member having an inner diameter (42) adjacent the one open end (38) thereof greater than the outer diameter (13) of the outer cylindrical surface of said pipe, said inner surface (34) tapering down to a diameter (44) less than the outer diameter of the outer cylindrical surface of said pipe, said sleeve member in said second position having at least a section of said tapering inner surface (34) of said sleeve member extending about the open end (3') of said pipe and about at least a portion (21) of the outer surface of said pipe (5) adjacent the open end (3') thereof.

2. The pipe fitting of claim 1 further including sealing solvent (19) positioned directly between the outer surface (21) of said pipe adjacent the open end (3') thereof and the section of the tapering inner surface (34) of said sleeve member (6) extending thereabout in said second position.

3. The pipe fitting of claim 1 wherein said main body (4) has an open end (12) and an outer surface (30) tapering inwardly toward and along said second axis (8) away from said open end (12) of the main body wherein said means for preventing said sleeve member (6) from being slid beyond said second position along the second axis (8) relative to said main body (4) includes said tapering outer surface (30) of the main body.

4. The pipe fitting of claim 1 wherein said sleeve member (6) includes an inner surface (36) tapering outwardly along the second axis (8) from adjacent the other open end (14) of said sleeve member toward the one open end (38) thereof, said preventing means including said outwardly tapering inner surface (36) of said sleeve member (6) wherein said inwardly tapering outer surface (30) of said main body (4) and said outwardly tapering inner surface (36) of said sleeve member at least substantially abut and mate when said sleeve member is in said second position.

5. The pipe fitting of claim 4 further including sealing solvent (19) positioned directly between said inwardly tapering outer surface (30) of said main body and said outwardly tapering inner surface (36) of said sleeve member in said second position.

6. The pipe fitting of claim 5 further including sealing solvent (19) positioned directly between the outer surface (21) of said pipe adjacent the open end (3') thereof and the section of the tapering inner surface (34) of said sleeve member (6) extending thereabout in said second position.

7. The pipe fitting of claim 1 wherein said main body (4) has an open end (12) positioned adjacent the open end (3') of said pipe and wherein the outer diameter (48) of the open end (12) of the main body is no greater than the outer diameter (13) of said pipe (5).

8. The pipe fitting of claim 7 wherein the outer diameter (48) of the open end (12) of said main body (4) is less than the outer diameter (13) of said pipe (5).

9. The pipe fitting of claim 1 wherein said pipe is made of substantially rigid, inflexible material.

10. The pipe fitting of claim 9 wherein said pipe material is polyvinylchloride.

11. The pipe fitting of claim 1 further including a second sleeve member (6') extending about at least a second part of said main body and mounted for sliding movement relative to said main body between at least first and second positions spaced from each other along said main body, said main body further including means for preventing said second sleeve member from being slid along said main body beyond said first and second positions to thereby maintain said slidable second sleeve member on said main body.

12. The pipe fitting of claim 11 further including a second, cylindrical pipe extending along and about a third axis and having inner and outer cylindrical surfaces with respective inner and outer diameters, the second pipe further having at least one open end, said second sleeve member in said second position having at least a section thereof extending about the open end of said second pipe and about at least a portion of the outer surface of said second pipe adjacent the open end thereof.

13. The pipe fitting of claim 12 wherein said open ends of said pipes are spaced a predetermined distance from each other in substantially fixed positions with said first and third axes substantially co-linear and said main body extends along said second axis for a distance no greater than said predetermined distance between said open ends of said pipes.

14. The pipe fitting of claim 13 wherein said main body extends along said second axis for a distance less than said predetermined distance between said open ends of said pipes.

15. The pipe fitting of claim 13 wherein said sleeve members in said respective first positions on said main body are within the distance the main body extends along the second axis wherein said main body with said sleeve members in said respective first positions can be moved to between said open ends of said pipes to align said second axis substantially colinearly with said first and third axes.

16. The pipe fitting of claim 15 wherein said main body is Tee-shaped with said parts of said main body forming two of the three legs of said Tee-shape.

17. The pipe fitting of claim 13 wherein said parts of said main body form an elbow and said first and third axes are substantially perpendicular.

18. The pipe fitting of claim 13 wherein said first and third axes are substantially perpendicular.

19. A pipe fitting (2) for a substantially cylindrical pipe (5), the pipe extending along and about a first axis (23) and having inner and outer cylindrical, substantially smooth, non-tapered, non-threaded surfaces with respective inner and outer, constant diameters, the pipe further having at least one open end (3'), said pipe fitting (2) having a main body (4) with at least a part thereof extending along and about a second axis (8) and having at least first (4') and second (4") portions, said first portion (4') having a substantially cylindrical outer surface, said second portion (4") being integral with said first portion and extending along said second axis (8) away from said first portion (4') toward the open end (3') of the pipe with said first (23) and second (8) axes substantially co-linear, said second portion (4") having at least one open end (12) and an outer surface (30) tapering outwardly along said second axis from said first portion (4') substantially to the open end (12) of said second portion (4"), said tapering outer surface (30) of the second portion having a maximum outer diameter (48) adjacent the open end (12) of the second portion (4") no greater than the outer diameter (13) of the outer cylindrical surface of the pipe (5), said pipe fitting further including a sleeve member (6) extending about said part of said main body (4) and mounted for sliding movement relative to said main body between at least first and second positions spaced from each other along said second axis (8), said sleeve member having first (14) and second (38) open ends spaced from each other along said second axis (8) and having a substantially smooth, non-threaded inner surface (34) extending along and about said second axis (8) substantially between the open ends (14, 38) of the sleeve member (6), said main body (4) being positionable adjacent the open end (3') of said pipe (5) with said first (23) and second (8) axes substantially co-linear, said sleeve member (6) in said second position having at least a section of the inner surface (34) of the sleeve member extending about the open end (3') of said pipe and about at least a portion (21) of the outer surface of the pipe (5) adjacent the open end (3') thereof.

20. The pipe fitting of claim 19 wherein the maximum outer diameter (48) of the tapering outer surface (30) of the second portion (4") of the main body (4) adjacent the open end (12) of the second portion is less than the outer diameter (13) of the pipe (5).

21. The pipe fitting of claim 19 further including sealing solvent (19) positioned directly between the outer surface (21) of the pipe (5) adjacent the open end (3') thereof and the section of the inner surface (34) of the sleeve member extending thereabout in said second position.

22. The pipe fitting of claim 19 wherein said sleeve member has a tapering inner surface (34) at least substantially abutting and mating with the tapering outer surface (30) of said second portion (4") when said sleeve member is in said second position.

23. The pipe fitting of claim 22 further including sealing solvent (19) positioned directly between the tapering inner surface (34) of said sleeve member and the tapering outer surface (30) of said second portion (4") when said sleeve member is in said second position.

24. The pipe fitting of claim 19 further including means for preventing said sleeve member from being slid along said second axis (8) beyond said first and second positions to thereby maintain said slidable sleeve member (6) on said main body (4).

25. The pipe fitting of claim 24 wherein said preventing means includes said tapering outer surface (30) of the second portion of the main body.

26. The pipe fitting of claim 19 further including means for preventing said sleeve member from being slid along said second axis beyond said second position to thereby prevent said slidable sleeve member from being removed from said main body by moving beyond said second position.

27. The pipe fitting of claim 26 wherein said preventing means includes said tapering outer surface (30) of the second portion of the main body.

28. The pipe fitting of claim 1 wherein said main body (4) has an open end (12) and an inner surface (30') tapering inwardly toward and along said second axis (8) away from said open end (12) of the main body.

29. The pipe fitting of claim 19 wherein said at least one open end (12) of said second portion (4") has an inner surface (30') tapering outwardly along said second axis (8) from said first portion (4') to the open end (12) of said second portion (4").

* * * * *